United States Patent
Khandelwal

(10) Patent No.: US 9,973,393 B2
(45) Date of Patent: May 15, 2018

(54) UTILIZING A CONTROLLER FOR PREPROGRAMMING A NETWORK BEFORE REMOVAL OF A NETWORK DEVICE

(71) Applicant: International Business Machines Corporation, Armonk, NY (US)

(72) Inventor: Haresh U. Khandelwal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 14/320,792

(22) Filed: Jul. 1, 2014

(65) Prior Publication Data
US 2016/0006799 A1    Jan. 7, 2016

(51) Int. Cl.
*H04L 12/24*    (2006.01)
*H04L 12/751*    (2013.01)

(52) U.S. Cl.
CPC .......... *H04L 41/20* (2013.01); *H04L 41/0813* (2013.01); *H04L 41/0836* (2013.01); *H04L 45/02* (2013.01)

(58) Field of Classification Search
CPC ..... H04L 41/20; H04L 45/02; H04L 41/0813; H04L 41/0836
See application file for complete search history.

(56) References Cited

U.S. PATENT DOCUMENTS

| | | | |
|---|---|---|---|
| 6,944,786 B2 * | 9/2005 | Kashyap | G06F 11/20 714/4.4 |
| 9,432,255 B1 * | 8/2016 | Hasan | H04L 41/0816 |
| 2003/0021223 A1 * | 1/2003 | Kashyap | H04L 41/0663 370/217 |
| 2005/0171799 A1 * | 8/2005 | Hull | G06Q 10/107 705/319 |
| 2009/0157795 A1 * | 6/2009 | Black | G06Q 10/10 709/202 |
| 2009/0222348 A1 * | 9/2009 | Ransom | G06Q 30/02 705/14.73 |
| 2012/0150960 A1 * | 6/2012 | Nalawade | G06Q 30/02 709/204 |
| 2013/0066967 A1 * | 3/2013 | Alexander | G06Q 50/01 709/204 |

(Continued)

FOREIGN PATENT DOCUMENTS

| | | |
|---|---|---|
| WO | 2013070941 A1 | 5/2013 |
| WO | 2013093857 A1 | 6/2013 |

OTHER PUBLICATIONS

Liu et al., "zUpdate: Updating Data Center Networks with Zero Loss", SIGCOMM'13, Aug. 12-16, 2013, Hong Kong, China, Copyright 20xx ACM 978-1-4503-2056-6/13/08, <http://www.cs.duke.edu/~xinwu/pubs/2013_sigcomm_zupdate.pdf>.

Reitblatt et al., "Abstractions for Network Update", SIGCOMM'12, Aug. 13-17, 2012, Helsinki, Finland, Copyright 2012 ACM 978-1-4503-1419-0/12/08, <http://s3.amazonaws.com/academia.edu.documents/30942366/consistent-updates-sigcomm12.pdf?AWSAccessKeyId=AKIAIR6FSIMDFXPEERSA&Expires=1381730237&Signature=RieBHdRg%2FDGOaGmDDbyS5TCmCVk%3D&response-content-disposition=inline>.

(Continued)

*Primary Examiner* — Joe Chacko
(74) *Attorney, Agent, or Firm* — Michael O'Keefe

(57) ABSTRACT

A first computing device determines that a first network device is to be removed from a network, where the network includes one or more network devices. The first computing device determines a first forwarding scheme for the network, where the first forwarding scheme does not include the first network device. The first computing device transmits the first forwarding scheme to the at least one of the one or more network devices in the network.

6 Claims, 3 Drawing Sheets

(56) References Cited

U.S. PATENT DOCUMENTS

| | | | |
|---|---|---|---|
| 2013/0067114 A1* | 3/2013 | Hjelm | G06Q 50/01 709/243 |
| 2013/0194914 A1 | 8/2013 | Agarwal et al. | |
| 2013/0212491 A1* | 8/2013 | Yerli | H04L 51/32 715/753 |
| 2013/0215769 A1 | 8/2013 | Beheshti-Zavareh et al. | |
| 2013/0219037 A1 | 8/2013 | Thakkar et al. | |
| 2013/0223226 A1 | 8/2013 | Narayanan et al. | |
| 2013/0223440 A1 | 8/2013 | DeCusatis et al. | |
| 2013/0266007 A1 | 10/2013 | Kumbhare et al. | |
| 2013/0290449 A1* | 10/2013 | Norby | H04L 51/32 709/206 |
| 2013/0311900 A1* | 11/2013 | Schleier-Smith | H04L 65/403 715/753 |
| 2013/0340097 A1* | 12/2013 | Gowel | G06Q 10/10 726/28 |
| 2014/0114738 A1* | 4/2014 | Tseng | G06Q 30/0241 705/14.27 |

OTHER PUBLICATIONS

Vanbever et al., "HotSwap: Correct and Efficient Controller Upgrades for Software-Defined Networks", HotSDN'13, Aug. 16, 2013, Hong Kong, China, Copyright 2013 ACM 978-1-4503-2178-5/13/08, <http://www.vanbever.eu/pdfs/vanbeyer_hotswap_hotsdn_2013.pdf>.

* cited by examiner

UTILIZING A CONTROLLER FOR PREPROGRAMMING A NETWORK BEFORE REMOVAL OF A NETWORK DEVICE

BACKGROUND OF THE INVENTION

The present invention relates generally to software defined networking, and more particularly to utilizing a controller for preprogramming a network before removal of a network switch.

In current software defined networking (SDN) architecture, when a network switch gets upgraded, the SDN controller for the network is typically unaware. Therefore, when the network switch is removed and disconnected from the controller, the controller treats it like a TCP connection has gone down due to possible reasons such as, the network being down or the power being switched off. In such a scenario, the controller removes the switch from its forwarding base and re-programs the network to ensure that traffic keeps moving from/to the end hosts of the network. However, it may take time for the controller to receive the information that a switch is not operational, which can lead to a service interruption in the network.

SUMMARY

Embodiments of the present invention provide a system, method, and program product to preprogram a network before removal of a network device. A first computing device determines that a first network device is to be removed from a network, where the network includes one or more network devices. The first computing device determines a first forwarding scheme for the network, where the first forwarding scheme does not include the first network device. The first computing device transmits the first forwarding scheme to the at least one of the one or more network devices in the network.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code/instructions embodied thereon.

Embodiments of the present invention will now be described in detail with reference to the accompanying Figures.

Figure 1:
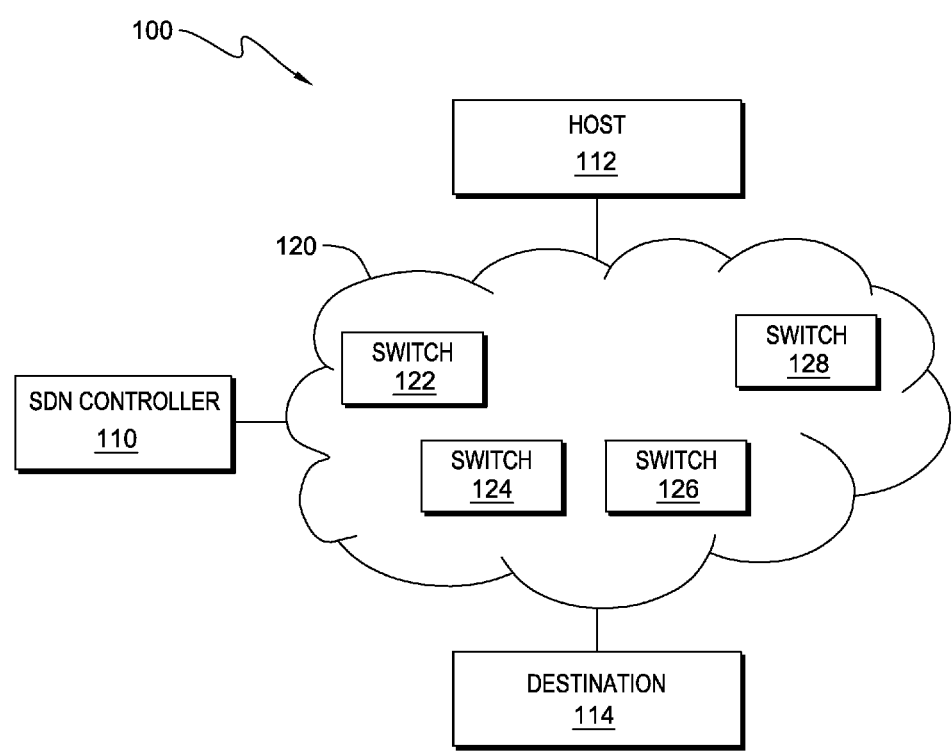
FIG. 1 is a functional block diagram illustrating the network controller system in accordance with an embodiment of the present invention.

FIG. 1 illustrates a network controller system 100, in accordance with an embodiment of the present invention. In an exemplary embodiment, network controller system 100 includes Host computing device 112, Destination 114, and SDN controller 110, all connected to network 120.

Host computing device 112 may be a desktop computer, a notebook, a laptop computer, a tablet computer, a handheld device, a smart-phone, a thin client, or any other electronic device or computing system capable of receiving inputs, executing computer program instructions, and communicating with another computing system via network 120. In general, host computing device 112 is any programmable device that includes a network interface that allows for network connectivity. In the exemplary embodiment, host computing device 112 is the source of a communication transmitted via network 120; although, in other embodiments, host computing device 112 may be the destination of a communication. Host computing device 112 will be described in more detail with reference to FIG. 3.

Destination computing device 114 may be a desktop computer, a notebook, a laptop computer, a tablet computer, a handheld device, a smart-phone, a thin client, or any other electronic device or computing system capable of receiving inputs, executing computer program instructions, and communicating with another computing system via network 120. In general, destination computing device 114 is any programmable device that includes a network interface that allows for network connectivity. In the exemplary embodiment, destination computing device 114 is the destination of a communication transmitted via network 120; although, in other embodiments, destination computing device 114 may be the source of a communication. Destination computing device 114 will be described in more detail with reference to FIG. 3.

In the exemplary embodiment, communication between host computing device 112, destination computing device 114, SDN controller 110, and network 120 may be implemented by a network connection such as an intranet, a local area network (LAN), or a wide area network (WAN). In the exemplary embodiment, the network connection includes a combination of connections and protocols that support communications between host computing device 112, destination computing device 114, SDN controller 110, and network 120, in accordance with an embodiment of the invention.

In the exemplary embodiment, network 120 includes switch 122, switch 124, switch 126, and switch 128. In other embodiments, network 120 may contain other computing devices and fewer or more switches. Switch 122, switch 124, switch 126, and switch 128 are network devices utilized to transfer data from one computing device to another, such as from host computing device 112 to destination computing device 114. Switch 122, switch 124, switch 126, and switch 128 will be described in more detail with reference to FIG. 3.

SDN controller 110 is a computing device capable of managing the flow of data within a network, such as network 120. In the exemplary embodiment, SDN controller 110 is capable of communicating with network 120 and each switch in network 120, via a network connection, as described above. In the exemplary embodiment, SDN controller 110 is capable of communicating with other computing devices via network connection, and receiving and transmitting information to and from other computing devices regarding the forwarding of information through network 120. In addition, in other embodiments, SDN controller 110 is capable of receiving user input via a user interface detailing forwarding information for network 120. The operations and functions of SDN controller 110 are described in further detail with regard to FIG. 2.

Figure 2:
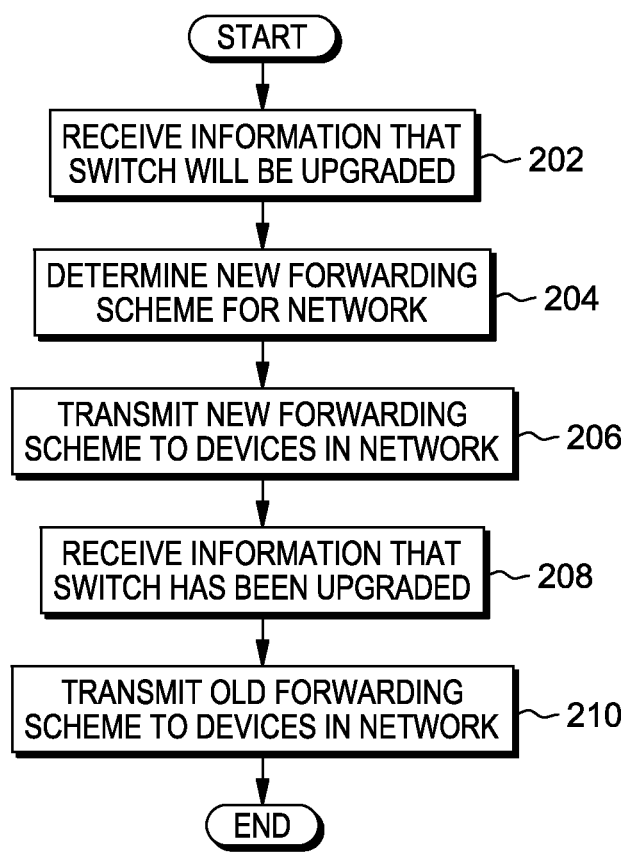
FIG. 2 is a flowchart depicting the operational steps of the controller of FIG. 1 in preprogramming a network based on switch removal, in accordance with an embodiment of the present invention.

FIG. 2 is a flowchart, illustrating the operational steps of SDN controller 110 in preprogramming a network in preparation for a switch upgrade, in accordance with an embodiment of the invention. In the exemplary embodiment, SDN controller 110 receives information detailing that a switch, such as switch 124, from network 120 will be upgraded and, therefore, removed from network 120 (step 202). SDN controller 110 may receive the information detailing that a switch will be upgraded by way of user input via a user interface, or from a network management system that is responsible for monitoring the devices within network 120. In other embodiments, SDN controller 110 may receive information that details that a switch from network 120 will be removed, powered off, or disconnected from network 120 for a reason other than an upgrade.

SDN controller 110 determines a new forwarding scheme for network 120 (step 204). In the exemplary embodiment, with switch 124 removed from network 120, the information that is normally received and transmitted by switch 124 can no longer proceed down the same path. Therefore, SDN controller 110 determines a new forwarding scheme by utilizing the other switches in network 120. For example, if information from host 112 typically travels through switch 122 to switch 124 to switch 126 and then to destination 114, SDN controller 110 may determine a new forwarding scheme where information from host 112 travels through switch 122 to switch 128 to switch 126 and then to destination 114.

SDN controller 110 then transmits the new forwarding scheme to the devices in network 120 (step 206). In the exemplary embodiment, SDN controller 110 transmits the new forwarding scheme to switch 122, switch 126, and switch 128 via a network connection, as described above (not transmitted to switch 124 because it will be removed for upgrade). The switches in network 120 then abide by the new forwarding scheme in determining where to transmit information. In the exemplary embodiment, SDN controller 110 transmits the new forwarding scheme to the devices in network 120 prior to the switch; in this embodiment, switch 124 being removed for upgrade.

SDN controller 110 then receives information that the switch has been upgraded and reinserted into network 120 (step 208). In the exemplary embodiment, SDN controller 110 receives the information that the switch, here switch 124, has been upgraded and reinserted into network 120 from the network management system. In other embodiments, SDN controller 110 receives the information that switch 124 has been upgraded and reinserted into network 120 from an adjacent switch or another switch in network 120.

SDN controller 110 then transmits the old forwarding scheme to the switches in network 120 (step 210). In the exemplary embodiment, SDN controller 110 transmits the old forwarding scheme to switch 122, switch 126, and switch 128 via a network connection, as described above (not transmitted to switch 124 because it already has the information). Once received by the switches in network 120, the switches will abide by the old forwarding scheme in determining where to transmit information. In other embodiments, SDN controller 110 may transmit the old forwarding scheme to the switches in network 120 prior to switch 124 being reinserted into network 120.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention, as defined by the accompanying claims.

Figure 3:
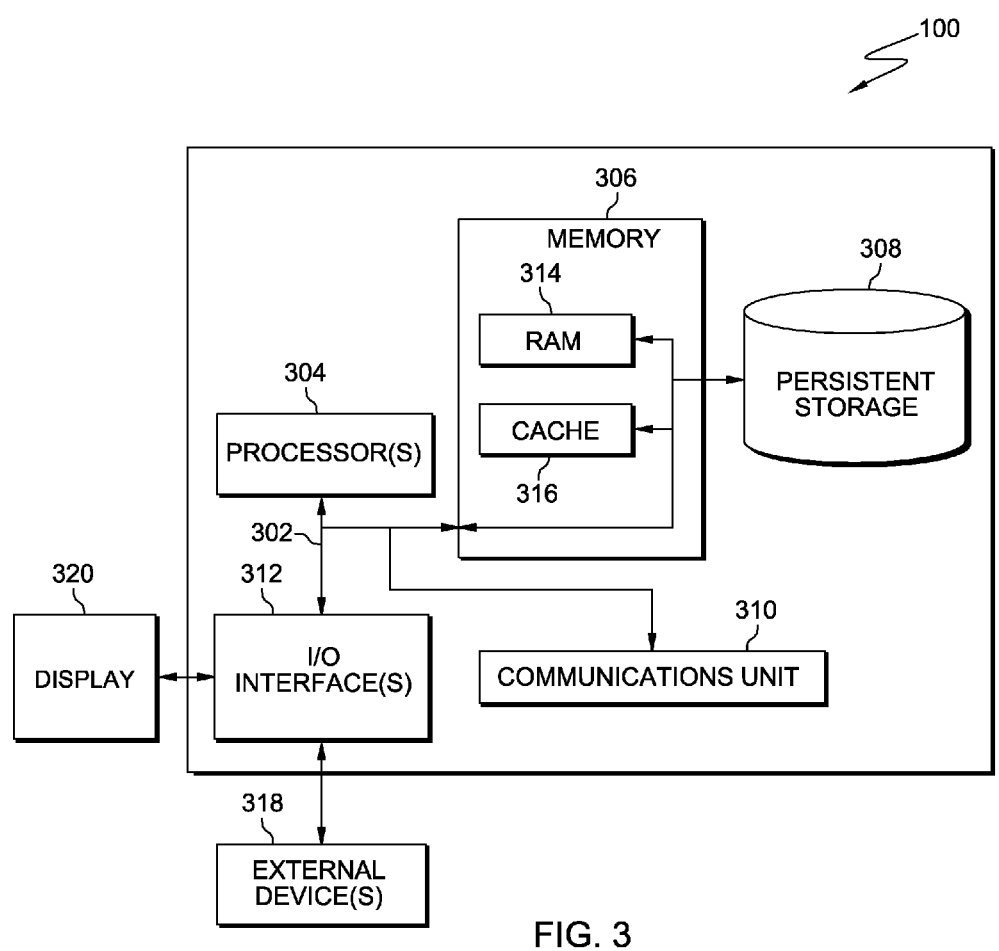
FIG. 3 is a block diagram depicting the hardware components of the network controller system of FIG. 1, in accordance with an embodiment of the invention.

FIG. 3 depicts a block diagram of respective components of SDN controller 110, host 112, destination 114, switch 122, switch 124, switch 126, and switch 128, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

SDN controller 110, host 112, destination 114, switch 122, switch 124, switch 126, and switch 128 include respective communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

The one or more operating systems and programs in SDN controller 110, host 112, destination 114, switch 122, switch 124, switch 126, and switch 128, are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. The one or more operating systems and programs in SDN controller 110, host 112, destination 114, switch 122, switch 124, switch 126, and switch 128 may be downloaded to persistent storage 308 through communications unit 310.

I/O interface(s) 312 allows for input and output of data with other devices that may be connected to a computing device of network controller system 100. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., the one or more operating systems and programs in SDN controller 110, host 112, destination 114, switch 122, switch 124, switch 126, and switch 128, can be stored on such portable computer-readable storage media and can be loaded onto persistent storage 308 via I/O interface(s) 312. I/O interface(s) 312 can also connect to a display 320.

Display 320 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by a software defined networking (SDN) controller configured to manage data forwarding schemes for a network, information detailing that a first network device of a plurality of network devices will be upgraded, wherein each of the plurality of network devices transfers data between at least two computing devices over the network using an old forwarding scheme, and wherein the information detailing that the first network device will be upgraded is transmitted by a computing device to which the SDN controller is connected;
   responsive to determining the old forwarding scheme is used to transmit the information by the first network device based on the information detailing that the first network device will be upgraded, transmitting, by the SDN controller, a new forwarding scheme to a portion of the plurality of network devices not including the first network device, wherein the new forwarding scheme is utilized by the portion of the plurality of network devices to transfer data between the at least two computing devices without using the first network device; and
   responsive to receiving information detailing that the first network device is upgraded and inserted into the network, transmitting, by the SDN controller, the old forwarding scheme to the plurality of network devices including the first network device, wherein the information detailing that the first network device is upgraded and inserted into the network is transmitted over the network by one of the plurality of network devices.

2. The method of claim 1, wherein each of the plurality of network devices includes a network switch.

3. A computer program product comprising:
   one or more non-transitory computer-readable storage devices and program instructions stored on at least one of the one or more non-transitory computer-readable storage devices, the program instructions comprising:
   program instructions to receive, by a software defined networking (SDN) controller configured to manage data forwarding schemes for a network, information detailing that a first network device of a plurality of network devices will be upgraded, wherein each of the plurality of network devices transfers data between at least two computing devices over the network using an old forwarding scheme, and wherein the information detailing that the first network device will be upgraded is transmitted by a computing device to which the SDN controller is connected;
   responsive to determining the old forwarding scheme is used to transmit the information by the first network device based on the information detailing that the first network device will be upgraded, program instructions to transmit, by the SDN controller, a new forwarding scheme to a portion of the plurality of network devices not including the first network device, wherein the new forwarding scheme is utilized by the portion of the plurality of network devices to transfer data between the at least two computing devices without using the first network device; and
   responsive to receiving information detailing that the first network device is upgraded and inserted into the network, program instructions to transmit, by the SDN controller, the old forwarding scheme to the plurality of network devices including the first network device, wherein the information detailing that the first network device is upgraded and inserted into the network is transmitted over the network by one of the plurality of network devices.

4. The computer program product of claim 3, wherein each of the plurality of network devices includes a network switch.

5. A computer system comprising:
   one or more computer processors;
   one or more non-transitory computer readable storage media;
   program instructions stored on the one or more non-transitory computer readable storage media for execution by at least one of the one or more processors, the program instructions comprising:
   program instructions to receive, by a software defined networking (SDN) controller configured to manage data forwarding schemes for a network, information detailing that a first network device of a plurality of network devices will be upgraded, wherein each of the plurality of network devices transfers data between at least two computing devices over the network using an old forwarding scheme, and wherein the information detailing that the first network device will be upgraded is transmitted by a computing device to which the SDN controller is connected;
   responsive to determining the old forwarding scheme is used to transmit the information by the first network device based on the information detailing that the first network device will be upgraded, program instructions to transmit, by the SDN controller, a new forwarding scheme to a portion of the plurality of network devices not including the first network device, wherein the new forwarding scheme is utilized by the portion of the plurality of network devices to transfer data between the at least two computing devices without using the first network device; and responsive to receiving information detailing that the first network device is upgraded and inserted into the network, program instructions to transmit, by the SDN controller, the old forwarding scheme to the plurality of network devices including the first network device, wherein the information detailing that the first network device is upgraded and inserted into the network is transmitted over the network by one of the plurality of network devices.

6. The computer system of claim 5, wherein each of the plurality of network devices includes a network switch.

\* \* \* \* \*